Dec. 22, 1931.  C. W. CARTER  1,837,252
DEVICE FOR PREPARING BEVERAGES SUCH AS COFFEE AND THE LIKE
Filed July 28, 1928  5 Sheets-Sheet 2

Inventor
Clarence W. Carter
By Alex. Lagaard
Attorneys

Dec. 22, 1931.  C. W. CARTER  1,837,252
DEVICE FOR PREPARING BEVERAGES SUCH AS COFFEE AND THE LIKE
Filed July 28, 1928  5 Sheets-Sheet 3

Inventor
Clarence W. Carter
By Alex. Lagaard
Attorneys

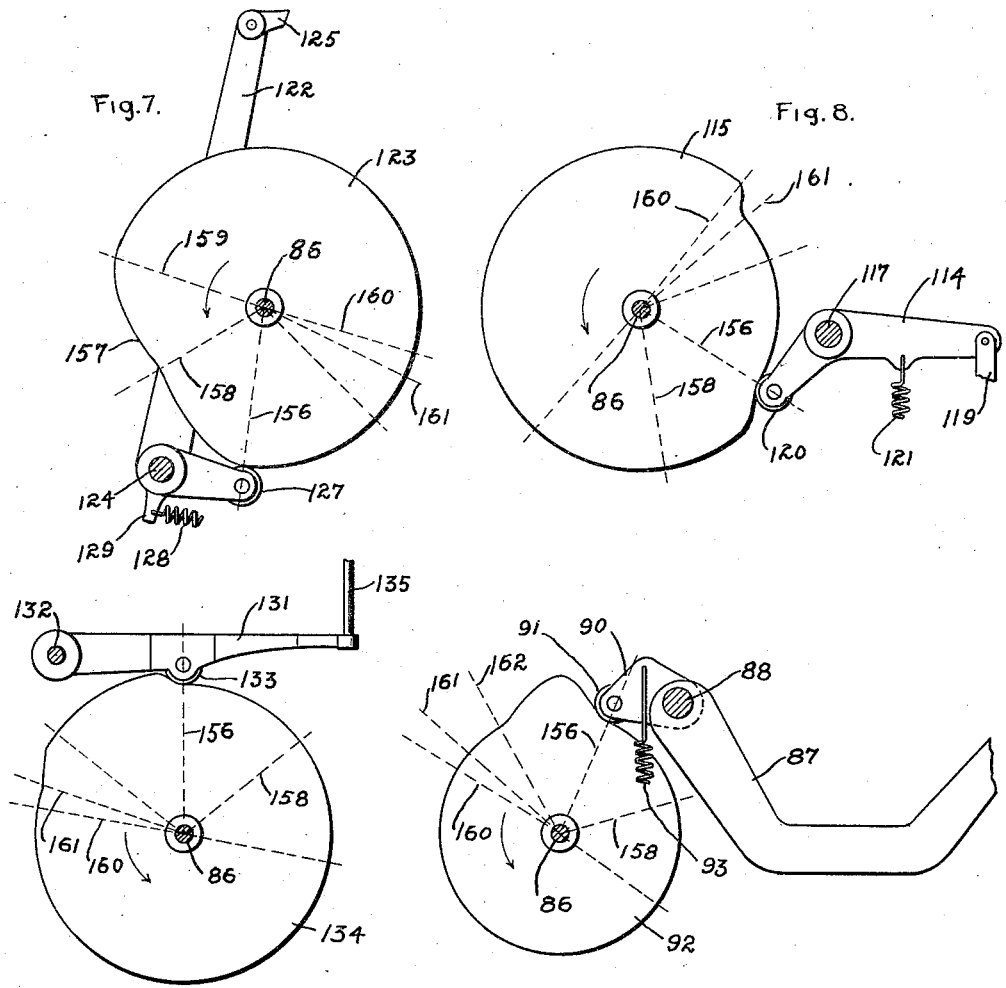

Patented Dec. 22, 1931

1,837,252

UNITED STATES PATENT OFFICE

CLARENCE W. CARTER, OF MINNEAPOLIS, MINNESOTA

DEVICE FOR PREPARING BEVERAGES SUCH AS COFFEE AND THE LIKE

Application filed July 23, 1928. Serial No. 295,862.

In the making of coffee beverage, particularly for hotel and restaurant use, it has been a common practice to place the coffee in bulk form in a fabric bag or in some suitable container with a perforated bottom covered with filter paper and to pour boiling hot water over the coffee. It is a well known fact that coffee ground extremely fine or pulverized produces more coffee beverage in proportion to the time treated than the coarser ground coffee. However, a great deal of difficulty has heretofore been encountered in making coffee beverage out of finely pulverized coffee by the above method. This is due to the fact that when the water is poured upon the pulverized coffee the finely ground coffee is more or less agitated and a muddy effect is produced. This causes the fibrous matter which produces the muddy effect to find its way through the cloth or filter paper and into the receptacle for the coffee beverage. When the coffee has been agitated the fibrous material freed from the same has a tendency to more or less prevent the passage of water through the ground coffee and the cloth or filter paper, greatly retarding the process of preparing the beverage and also allowing the water to remain in contact with the coffee grounds for too long a period, thereby producing an undesirable flavor in the coffee beverage.

The primary object of my invention is to produce a device whereby coffee beverage may be made in a minimum length of time from finely ground coffee so as to secure the maximum strength and quality of coffee from the ground coffee and at the same time to produce a clear coffee beverage practically free from particles of fibrous material.

Another object of the invention consists in the method of preparing coffee which resides in feeding the ground coffee in sheet-like formation upon a permeable member and in spraying water upon the ground coffee while in sheet-like formation.

An object of the invention resides in providing a table and a pan adjacent said table and in extending a ribbon forming a permeable member across said table and into said pan.

A still further object of the invention resides in providing a receptacle for ground coffee open at its bottom, and superimposing said ribbon and table and to further provide a movable closure for the bottom of said receptacle adapted in conjunction therewith to deposit a sheet of coffee upon said ribbon.

Another object of the invention resides in providing means for moving the ribbon with the sheet of coffee thereon from said table and into said pan and in further providing a spraying device for spraying water upon the coffee while in sheet-like formation in said pan.

An object of the invention resides in providing means for compacting the sheet of coffee disposed upon said ribbon so as to form the same of uniform density.

A still further object of the invention resides in constructing said spraying device in the form of a swinging arm whereby the spray is shifted from one end of the pan to the other.

A still further object of the invention resides in providing a ribbon feeding device whereby the ribbon is intermittently moved along said pan and in further forming said ribbon feeding device with a reverse feed mechanism whereby reverse movement is given to the ribbon at the end of its forward movement to cause the ribbon and coffee to descend to the bottom of said pan.

Still further objects of the invention reside in the particular construction whereby the various results of the device are automatically accomplished.

Other objects of the invention reside in the novel combination and arrangement of parts and in the details of construction hereinafter described and claimed.

In the drawings:

Fig. 5 is a fragmentary elevational sectional view taken on line 5—5 of Fig. 2 and drawn to a larger scale.

Fig. 7 is a diagrammatic view of the cam and operating mechanism for operating the ground coffee feed slide.

Fig. 8 is a diagrammatic view of the cam and operating mechanism for controlling the flow of water to the device.

Fig. 9 is a diagrammatic view of the cam and operating device for lifting the coffee receptacle up from the coffee ribbon.

Fig. 10 is a diagrammatic view of the cam and operating mechanism for moving the ribbon through the device.

Figure 1:
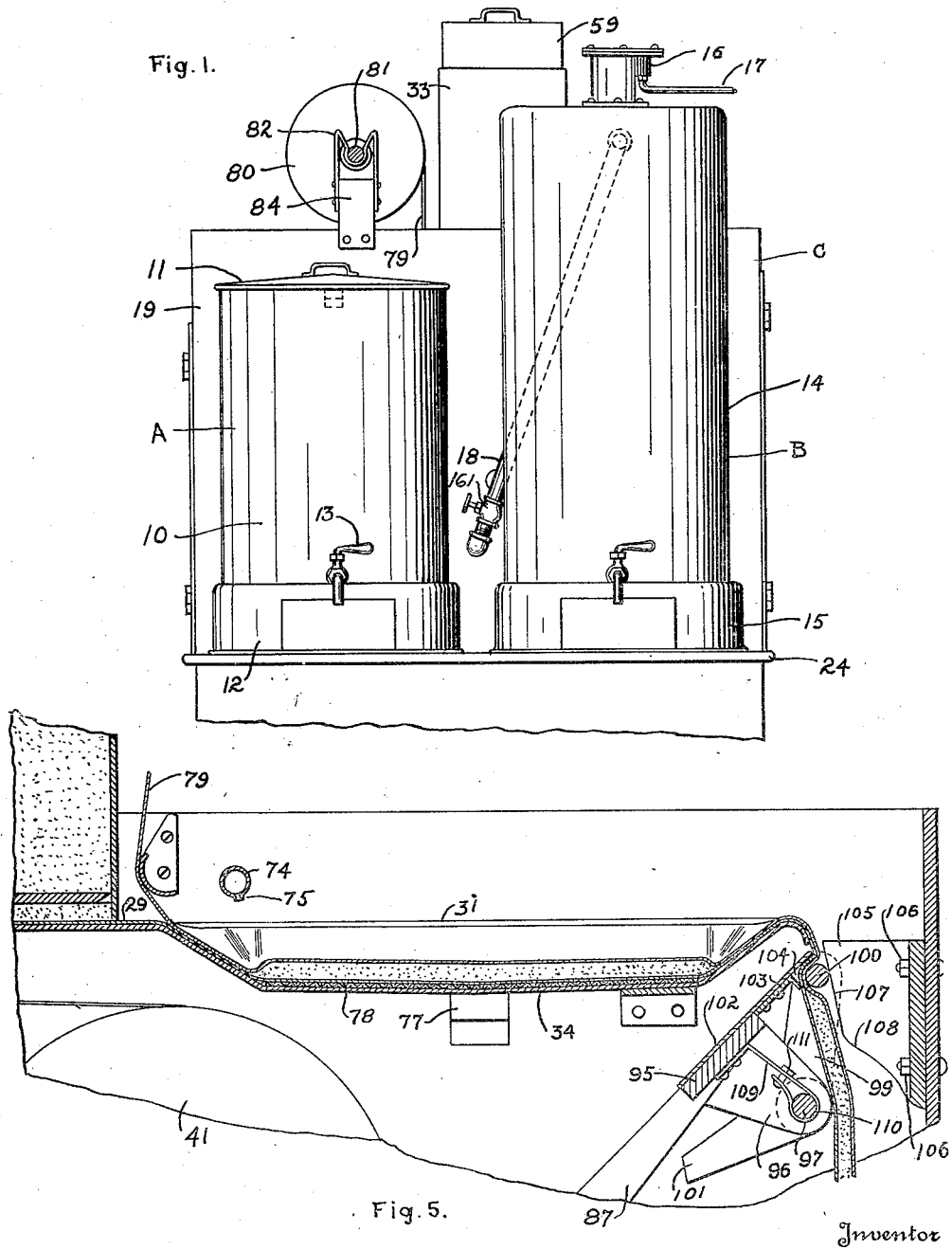
Fig. 1 is a front elevational view of a coffee preparing device illustrating an embodiment of my invention.

In the following description of my invention and in the claims I have used the words "coffee beverage" merely as illustrative, it being readily comprehended that the invention may be utilized for the preparation of other beverages such as tea and the like, or in fact for other purposes entirely different in which it is desired to subject a layer of substance to the action of a spray of water. I have further referred to ground coffee as indicating the coffee prior to the preparation of the beverage therefrom, though it is to be understood that coffee may be ground or pulverized to any degree necessary to the production of the most suitable beverage depending upon the particular brand of coffee used.

The invention includes a coffee urn A in which the prepared coffee beverage is finally discharged, a water reservoir B from which hot water is supplied for the preparation of the coffee, and a device C from which the beverage is prepared, all of which will be hereinafter more fully described in detail.

The coffee urn A may be of any suitable construction comprising a tank or reservoir 10 open at the top and adapted to be closed by means of a cover 11. This tank may be supported upon a base 12 in such a manner as to permit of the disposition of a gas burner beneath the same so that the coffee within said urn may at all times be kept at the proper temperature. A spigot 13 permits of withdrawing the coffee from the urn as the same is desired for consumption.

The reservoir B is similarly constructed to the urn A and comprises a closed tank 14 which is mounted upon a base 15 similar to the base 12. This reservoir is also arranged to be heated through a gas burner, not shown, and as will be noted is considerably higher than the coffee preparing device C and the urn A. Upon the upper portion of this reservoir is mounted a float valve mechanism indicated at 16, which includes a water supply pipe 17 adapted to be connected to any water supply system operating under a suitable pressure. The float valve mechanism 16 operates in the customary manner and serves to maintain the water within the reservoir 14 at a predetermined elevation. A water supply pipe 18 is connected from the upper portion of reservoir B and enters the coffee preparing device C where the same is utilized as will be later explained. A valve 161 in this pipe serves to control the flow of water into the device which governs the strength of the coffee beverage.

The coffee preparing device which I have indicated in its entirety at C, is housed within a case 19 comprising front and rear walls 20 and 21 and end walls 22 connected to said front and rear walls by means of angles 23, or any other suitable construction. These various walls may rest directly upon a counter or table such as designated at 24 or the entire device may be built up from the floor in which instance the table top 24 would form a part of the construction covering my invention. Within the interior of case 19 is arranged a partition 25 which is spaced from the wall 21 of said case and lies parallel therewith. This partition is connected to the end wall 22 by means of an angle 26 and is further connected to the rear wall 21 by means of a plate 27 and a number of angles 28. The various walls of this case are preferably constructed of a heavy sheet metal and are of such dimensions and strength as to support the various elements of the invention and to form bearings for the journaling of the various shafts used in connection with the same.

In the coffee preparing device the coffee which is contained within a receptacle 33 is fed on a ribbon 29 in sheet-like formation. Coffee so disposed is transferred by means of a ribbon feeding device indicated in its entirety at 30 across a pan 31. While superimposing this pan the same is sprayed with a spray of water from a water spraying device indicated at 32 whereby a coffee beverage is prepared and collected in the said pan from whence the prepared beverage is drained into the coffee urn A previously referred to. All of these various elements of my invention will now be successively described in detail.

Figures 2, 6:
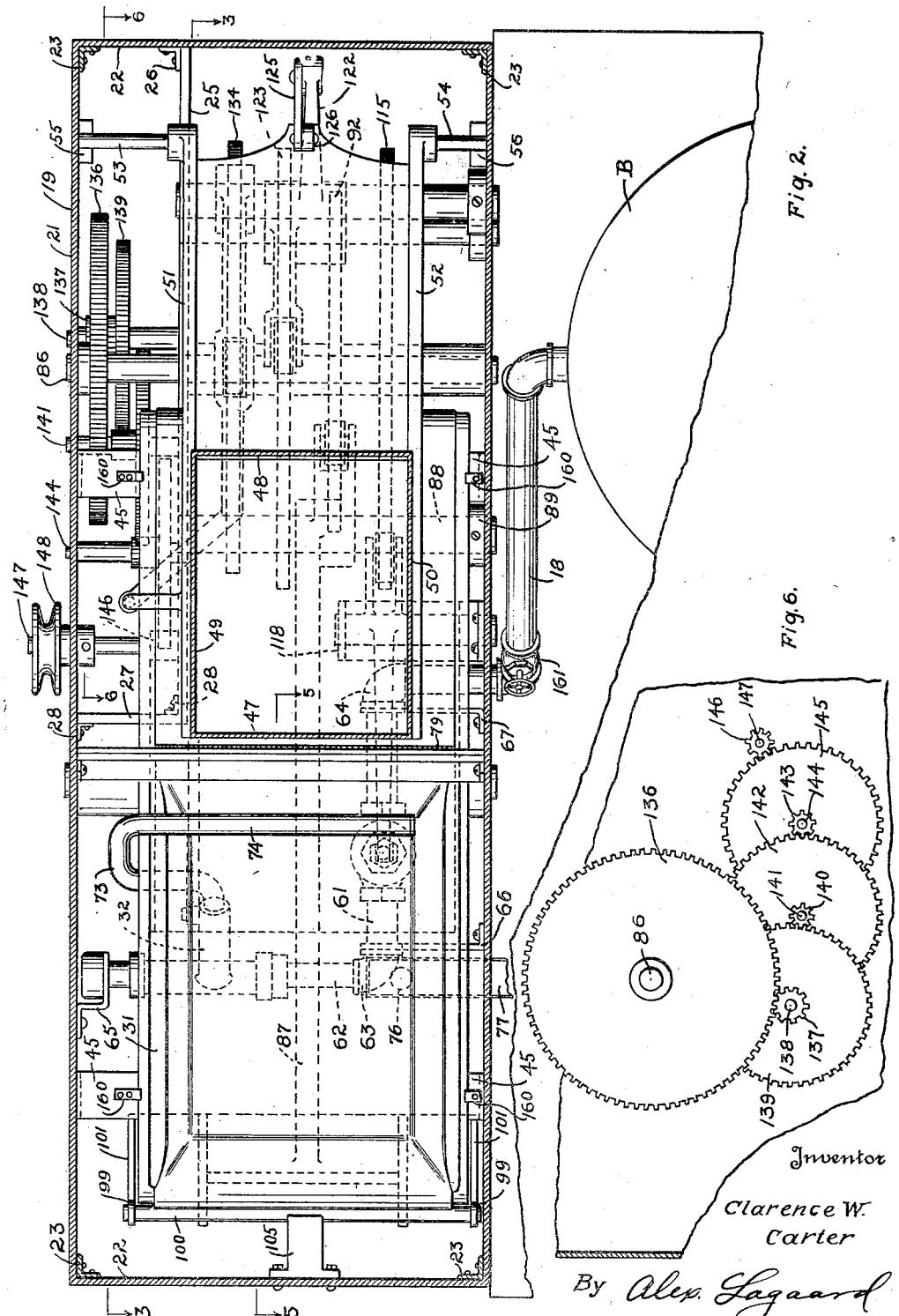
Fig. 2 is a plan sectional view of a portion of the structure shown in Fig. 1 taken on line 2—2 of Fig. 1 and drawn to a somewhat larger scale.
Fig. 6 is a fragmentary elevational sectional view taken on line 6—6 of Fig. 2 and illustrating the gear train for operating the device.
Figure 3:
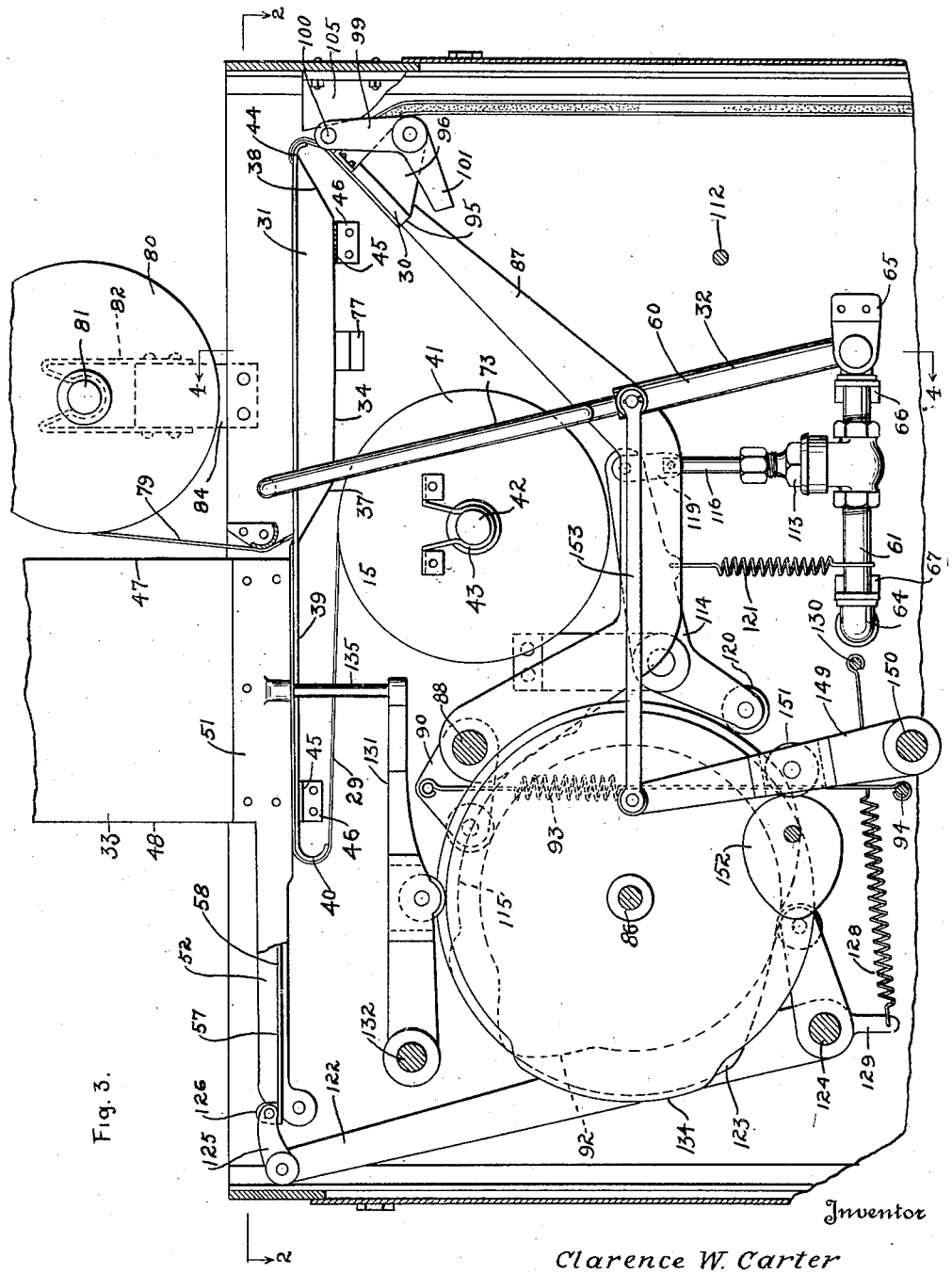
Fig. 3 is a longitudinal elevational sectional view taken on line 3—3 of Fig. 2.

The coffee pan 31 best shown in Figs. 2 and 3 is formed with a bottom 34 with sloping side walls 35 and 36 and sloping end walls 37 and 38. This pan is relatively shallow in depth and is disposed in a horizontal position within the case 19. From the end wall 37 of pan 31 extends a horizontal table 39 lying flush with the upper edges of said pan, which table terminates in a curved lip 40 extending downwardly therefrom. A similar lip 44 is formed on the end of the inclined wall 38. The entire structure comprising table 39 and pan 31 are supported by the side walls 20 and 21 of the case 19 through a number of cross bars 45 which are formed with depending ears 46 rigidly secured to the said cross bars. These cross bars have spring clips 160 which engage the edge of said pan and table and hold the same in place.

The ribbon 29 is wound upon a reel 41 having a shaft 42, which reel is supported through said shaft in spring clips 43 secured to the side walls 20 and 21 of the case 19. These clips are so constructed as to yieldingly receive the ends of the shaft 42 when the same are forced downwardly and in operation grip the said shaft and provide a tension on the ribbon to prevent the unintentional unwinding thereof. The ribbon 29 passes around the curved lip 40 of table 39 and over said table and across the pan 31 where the same leaves the device over the lip 44 formed on pan 31. In the installation of the ribbon the pan 31 and receptacle 33 are first removed permitting of inserting shaft 42 into the clips 43. The ribbon is moved across the said pan and table 39 by means of the shifting device 30, as will presently be described.

Immediately above the table 39 is disposed the receptacle 33 for ground coffee. This receptacle is formed with end walls 47 and 48 and side walls 49 and 50 and is constructed open at the top and bottom. To the side walls 49 and 50 are attached two arms 51 and 52 which extend outwardly beyond said receptacle toward the end wall 22 of case 19. The extreme ends of these arms terminate in outwardly extending pins 53 and 54 which are adapted to lodge in bearings 55 and 56 attached to the walls 20 and 21 of case 19. These bearings are preferably open at the upper portions thereof so that the entire coffee receptacle may be bodily lifted from the device and readily replaced when desired and at the same time serve to support the receptacle when mounted, for movement toward and from the table 39. The two arms 51 and 52 are constructed with facing grooves 57 in which is slidably mounted a slide 58 serving as a closure for the bottom of the receptacle 33. The groove 57 is so disposed that when the ends of the walls 49 and 50 and 47 of receptacle 33 rest upon the table 39, the said slide is positioned in a predetermined spaced parallel relation with respect to said table. A weight 59, Fig. 1 serves to force the coffee downwardly within the receptacle 33 and upon the slide 57 so as to compact the sheet of coffee subsequently formed on the ribbon 29.

In the feeding of the coffee from the receptacle 33 the said receptacle is caused to rest upon the ribbon 29 and table 39. Slide 57 is then withdrawn causing the weight 59 to force the coffee downwardly and upon the upper run of the ribbon 29. Slide 57 is next moved into closing position which causes a sheet of ground coffee to be severed from the bulk and to lie in compacted form upon the ribbon 29. The coffee receptacle 33 is subsequently raised and the ribbon 29 with the sheet of coffee thereon drawn across the pan 31 and allowed to descend upon the bottom thereof. While so disposed the spray of water is sprayed over the sheet or layer of coffee and the liquid permeating through the same and the ribbon collected and drained into the coffee urn A.

Figure 4:
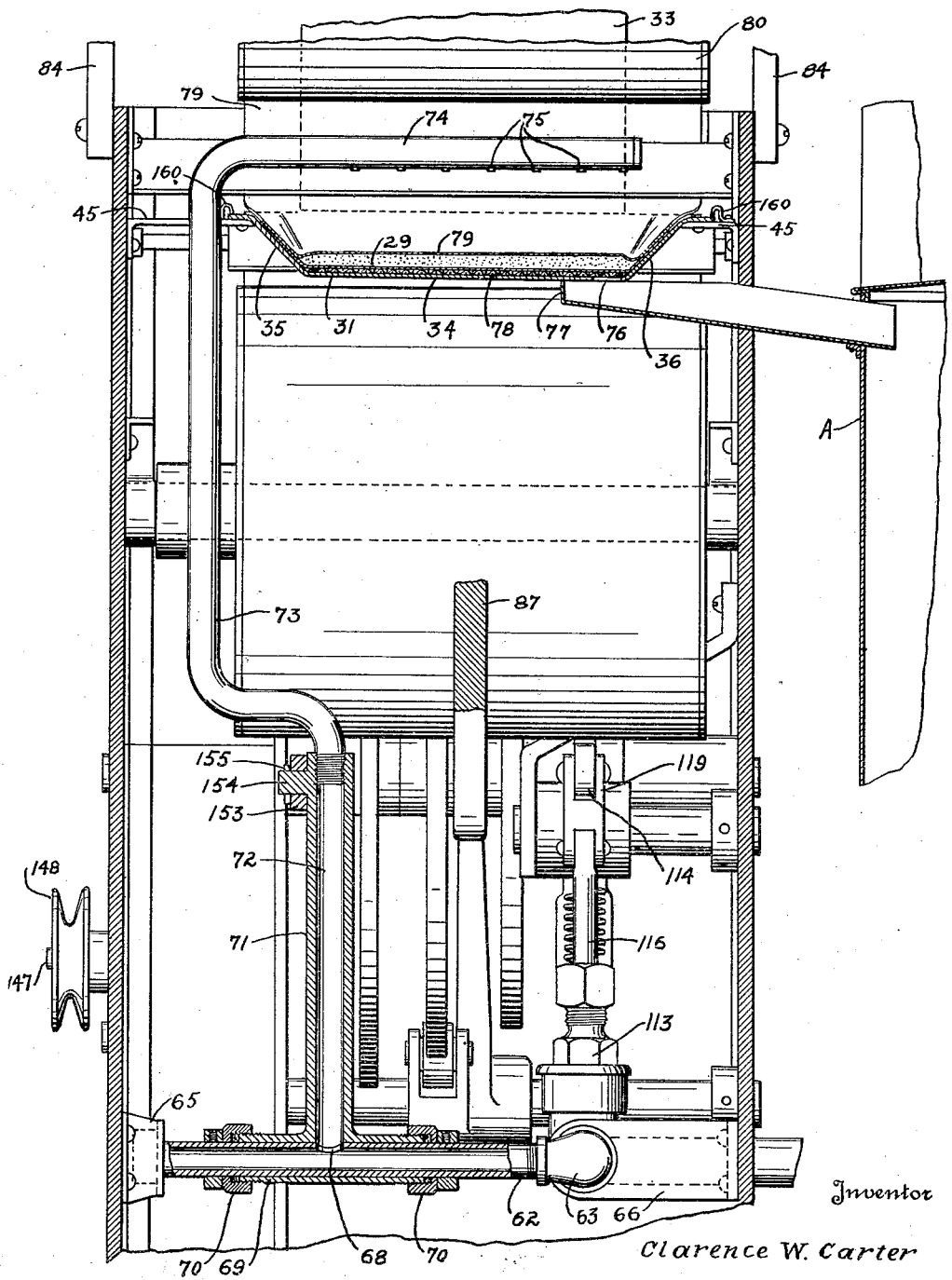
Fig. 4 is a transverse elevational sectional view taken on line 4—4 of Fig. 3.

For spraying the water over the layer of coffee in the pan 31, I employ the spraying device 32 which comprises a swinging member 60 best shown in detail in Fig. 4. This member is constructed in the shape of an inverted T and is formed with an upstanding stem 71 and a horizontal base 69 connected therewith. The water supply pipe 18 is brought into the case 19 through the side wall 20 and is arranged with a longitudinal run 61 and a transverse run 62 connected by suitable elbows 63 and 64. These various runs are supported within the case by means of brackets 65, 66 and 67 which hold the structure in fixed position. The run 62 of the water supply pipe is constructed with an opening 68 and passes through the base 69 of member 60 which is journaled on said pipe run. The extreme ends of the base 69 are threaded to receive packing nuts 70 whereby a water tight connection between the said swinging member 60 and the pipe run 62 is effected. The stem 71 is formed with a central passageway 72 which communicates with the interior of the pipe 18 through the opening 68. A tube 73 is directly connected to the stem 71 and communicates with the passageway 72. This tube is formed with a horizontal run 74 adapted to overlie the pan 31, which tube run is formed with a number of nozzles 75 adapted to spray water downwardly and upon the layer of coffee disposed within the pan 31. By swinging the member 60 upon the pipe run 62 the nozzles 75 are caused to successively spray the water over the entire area covered by the sheet or layer of ground coffee. Due to the fact that the sheet of coffee is compacted through the action of the weight 59 the water sprayed upon the coffee in pan 31 permeates slowly through the same, absorbing the coffee extract and forming the usual coffee beverage.

For the purpose of collecting the coffee from the pan 31 an opening 76 is formed in one end of the bottom 34 adjacent the wall 36 of said pan. A trough 77 adapted to be positioned beneath this opening extends through the wall 20 of case 19 and enters the coffee urn A as best shown in Fig. 4. The ribbon 29 within the pan 31 is preferably arranged to rest upon a screen 78 or some other suitable member which will allow the coffee preparation permeating through the said ribbon to rapidly drain toward the opening 76. In this manner uniformity of the coffee beverage is assured together with the rapid draining of the same from the device.

If desired, a second ribbon 79 may be employed to cover the sheet of coffee deposited upon the ribbon 29. Such second ribbon is preferably reeled upon a reel 80 similar to the reel 41 which is mounted immediately above the pan 31. This reel is provided with a shaft 81 which is supported in spring clips 82 similar to the clips 43, and attached to supports 84 secured to the side walls 20 and 21 of case 19. The clips 82 provide sufficient friction upon the shaft 81 to prevent the ribbon from unreeling, the same as the clips 43. This ribbon may, however, be dispensed with if desired and the device operated solely with the ribbon 29, when in such case it may be necessary to regulate the discharge of water as to avoid disturbing the sheet of coffee carried by said ribbon.

The various movements of the ribbons and the feeding of the coffee over the same is automatically accomplished in the instant form of the invention through a series of cams which are mounted upon a single cam shaft 86 journaled in the side walls 20 and 21 of case 19 and the partition 25 thereof, which cams have been illustrated in diagrammatic form in Figs. 7 to 10 inclusive.

For moving the ribbons along the pan 31 I employ a U-shaped lever 87 which is secured to a shaft 88 journaled in the wall 20 and partition 25 of case 19. This shaft is held from longitudinal movement by means of collars 89 and is disposed somewhat above the cam shaft 86. The lever 87 has an arm 90 formed thereon which carries a roller 91 adapted to engage the edge of a cam 92 mounted on shaft 86. A spring 93 is secured to this arm at one end and at its other end to a rod 94 attached to case 19. This spring serves to hold the roller 91 in contact with the surface of cam 92 and to swing the lever 87 upwardly to bring the further end thereof in close proximity to the lip 44 formed on pan 31. At this end of lever 87 the same is formed with a cross head 95 terminating in two downwardly extending ears 96. A shaft 97 is journaled in these ears and has attached to its extreme ends two arms 99 issuing outwardly therefrom. A rod 100 secured at its ends to the said arms causes said arms to move in unison when the same are oscillated in a manner to be presently described. Each of the arms 99 carries a downwardly extending finger 101 through which movement of the rod 100 in one direction may be had. Upon the cross head 95 is attached a plate 102 which extends outwardly beyond the same to within a short distance of the lip 44. This plate has secured to the underside thereof an angle plate 103 which forms a corner indicated at 104 between the outstanding leg of said angle and plate 102. This corner is so disposed as to receive the rod 100 when the arms 99 are oscillated in the proper direction. Both of the ribbons 29 and 79 are threaded between the plate 102 and the rod 100, which rod when moved toward the corner 104, wedges the ribbons against the walls thereof, serving as a clutch for holding the ribbon from movement relative to arm 87. When this clutch mechanism has been set, the arm 87 may be drawn downwardly through the action of cam 92 which causes the ribbons to be drawn over the top of the pan 31 and downwardly into the case 19. As the ribbon is fed through the machine the same drops into the bottom of the case below the counter 24 where the same may be subsequently reclaimed if desired.

For bringing the rod into engagement with the member 102 to clutch the ribbon, I employ a stationary cam 105 which is attached to the end wall 22 of casing 19 by means of bolts 106. This cam is formed with an arcuate surface 107 having its center at the axis of shaft 88 and with a spiraling surface 108 gradually increasing in radius. These two surfaces of cam 105 are adapted to engage the rod 100 during the upward movement of arm 87 so as to bring the said rod into operative engagement to clutch the ribbon as heretofore referred to. In conjunction with the shaft 97 to which the arms 99 are rigidly secured I employ a friction device indicated at 109 in Fig. 5, which is secured to the cross head 95 of arm 87. This friction device comprises a loop 110 of resilient material which surrounds the shaft 97 and which affords frictional contact between the same. A bolt 111 passing through the said loop serves to regulate the amount of friction upon the said shaft. For moving the rod 100 out of engagement with the member 102 so as to release the ribbon, I employ a rod 112 which is secured across the side walls 20 and 21 of case 19 and which is so arranged as to engage the fingers 101 when the arm 87 reaches its extreme lowermost position. Such movement swings the rod clear from the member 102 which allows the said arm 87 to travel upwardly from the ribbon until said rod 100 strikes the surface 108 and cam 105. At such time the said rod is again swung inwardly to grip the ribbon whereby the same will be subsequently drawn along the pan 31 when the lever 87 makes its next distance movement. It will be noted that rod 100 is moved into operative position at a time appreciably in advance of the lever 87 reaching its uppermost position. This is for the express purpose of feeding the ribbons 29 and 79 in a reverse direction at the end of the ribbon feeding movement so as to cause the said ribbons and the deposit of coffee therebetween to descend to the bottom 34 of pan 31. When the arm 87 first operates the same draws the ribbons against the upper edges of the pan 31 and in elevated position relative to the bottom 34 thereof. The particular reverse movement specified serves to bring the ribbons and coffee back to the proper position to receive the water from the various nozzles 75 of the tubular member 74.

In conjunction with the water supply system for spraying the coffee, a valve 113 is employed which is operated through a lever 114 and a cam 115 mounted on shaft 88. The valve 113 may be of ordinary construction and is provided with a valve stem 116 through which the said valve may be opened and closed upon raising and lowering thereof. This valve is preferably arranged in the longitudinal run 61 of water supply pipe 18 and is disposed with the stem 116 extending upwardly. The lever 114 is mounted on a shaft 117 which is journaled in the wall 20 of case 19 and in a bracket 118 secured to said wall. One end of lever 114 is connected by means of a link 119 to the valve stem 116 while the other end of said lever carries a roller 120 adapted to engage the edge of the cam 116. A spring 121 is attached to lever 114 and to the longitudinal run 61 of pipe 18. In operation, this spring serves to maintain the valve 113 closed, while the cam 115 opens said valve against the action of said spring.

The slide 58 of coffee receptacle 33 is operated by means of a vertically disposed bell crank 122 and a cam 123 mounted on the shaft 86. The bell crank 122 is attached to a shaft 124 which is journaled in the side walls 20 and partition 25 of case 19. One end of the bell crank 122 is pivotally connected by means of a link 125 to a lug 126 rigidly secured to the slide. The other end of said bell crank carries a roller 127 which is adapted to engage the surface of the cam 123 so as to operate the said slide as the shaft 86 rotates. A spring 128 secured at one end to an ear 129 formed on the bell crank 122 and at its other end to a rod 130 attached to case 19, serves to normally hold the roller 127 in contact with the surface of cam 123 and move said slide into open position. As the shaft 86 rotates the said slide is first moved outwardly to allow the coffee to be deposited upon the ribbon 79 and is then returned to sever the sheet of coffee from the bulk thereof.

To permit of the movement of the ribbon 29 with the sheet of coffee thereon in undisturbed state from the receptacle 33, a lifter 131 is employed which is attached to a shaft 132 journaled in the wall 20 and partition 25 of case 19. This lifter carries a roller 133 intermediate the ends thereof, which roller is adapted to engage the surface of a cam 134 mounted on shaft 86. The end of the lifter 131 which is offset from the major portion thereof carries a vertically extending pin 135 which is adapted to engage the arm 51 supporting the receptacle 33. As the cam 134 rotates, the pin 135 is raised upwardly in such a manner as to simultaneously raise the entire receptacle 33 about its pivots so that the same becomes elevated above the sheet of coffee deposited upon the ribbon 29. Upon the raising of the said receptacle in this manner the shifting device 30 is free to draw the ribbon 29 across the pan 31 where the fresh deposit of coffee may be acted upon by the spray of water from the tube 74.

The cam shaft 86 is driven through a train of reduction gearing shown in detail in Fig. 6. As will best be seen in Fig. 2, shaft 86 extends through the space between the partition 25 and the wall 21 of case 19. Within this space and upon said shaft is attached a spur gear 136. This gear meshes with a spur pinion 137 on a shaft 138 situated somewhat below the shaft 86. Shaft 138 is journaled in the partition 25 and wall 21 and carries a spur gear 139 slightly smaller than the gear 136. This spur gear in turn meshes with a second spur pinion 140 mounted on a shaft 141. Shaft 141 is similarly journaled to shaft 138 and carries a spur gear 142 similar to spur gear 139. This gear in turn meshes with another pinion 143 fast on a shaft 144 which in turn carries a last spur gear 145 meshing with a spur pinion 146 on a shaft 147. Both the shafts 144 and 147 are journaled similar to the shafts 138 and 141 except that the shafts 147 extend outwardly beyond the wall 21 where the same has attached to it a pulley 148 by means of which the said shaft may be rotated from a suitable source of power such as an electric motor or other similar device. All of these gears as will be clearly seen in Fig. 2 are disposed within the space between the wall 21 and partition 25 of case 19.

For the purpose of oscillating the swinging member 60 I employ an oscillating arm 149 Fig. 3 which is attached to a shaft 150 journaled in the wall 20 and partition 25 of case 19. This arm has mounted in it at one end a roller 151 which engages a cam 152 mounted upon shaft 141. This shaft projects through the partition 25 where the same receives said cam so as to bring the lever 149 substantially in alignment with the member 60. At its remote end the arm 149 has pivoted to it a link 153 which in turn is pivoted at its other end to a trunnion 154 issuing outwardly from the upper end of the stem 71. A cotter pin 155 holds this link in place upon the said trunnion. The cam is of such formation as to give the portion 74 of the water spraying system a substantially uniform movement over the layer of coffee within the pan 31. In this manner all of the coffee receives the same amount of water so that the beverage is of uniform quality and strength. It will be noted that the cam 152 operates continuously and at a relatively higher rate of speed than the cam shaft 86 so that the tubular member 74 travels at all times regardless of whether or not the supply of water is cut on or cut off.

In the operation of the device the sequence of the various operations can best be comprehended from an inspection of Figs. 7 to 10 inclusive. In these figures the various cams have been illustrated separately though as a matter of fact the same are mounted upon the same shaft, namely, the cam shaft 86, and occupy the same relative positions as shown in these various figures. However, due to the disposition of the various rollers operating the various elements of the device the corresponding phases of the cams with respect to one another are different and for this reason corresponding positions upon the various cams have been indicated in dotted lines and correspondingly designated by the same reference characters. Assuming a fresh charge of coffee to have been deposited upon the ribbon 29 and properly disposed within the pan 31 the position of the various cams with respect to their respective rollers would be as indicated at position 156. At such position it will be noted that lever 87 is uppermost with the ribbon lying upon the bottom of pan 31. At this position the cam 115 engaging roller 120 is about to open the valve 113 so as to spray water upon the layer of coffee within the pan 31. At the same time the slide 57 is in closed position and the receptacle 33 rests upon the table 39. As the cam shaft 86 continues to rotate in the direction shown by the arrows, the roller 91 rides upon the circular face of cam 92 without effecting any movement of the lever 87. As soon as the roller 120 reaches the high portion of cam 115 the water valve 113 is fully opened and the spraying of water upon the layer of coffee in pan 31 continues. At position 156 roller 133 is on the circular portion of cam 134 which holds the pin 135 free from the coffee receptacle 33 allowing the same to rest upon the ribbon 29 and table 39. It will be noted from Fig. 7 that at position 156 roller 127 is about to travel along the inwardly extending portion 157 of cam 123 which causes the spring 128 to move lever 122 outwardly and draw the slide 57 with it. This permits the weight 59 to force the coffee in receptacle 33 downwardly and upon the ribbon 29 where the same is firmly compacted. When the cams reach position 158, slide 57 will be in its outermost position. As the cams continue to rotate the cam surface 157 forces the lever 122 inwardly so as to close the slide 58 and sever the sheet of coffee resting upon the ribbon 29 from the major portion of the bulk thereof. When roller 127 reaches position 159 slide 57 is completely closed. After leaving position 159 the cams rotate practically 180 degrees without altering the positions of the various members, during which time water is being sprayed upon the layer of coffee in the pan 31 and the coffee beverage prepared therefrom and drained into the coffee urn A. When cam 115 reaches position 160, the water supply is cut off. When cam 134 reaches position 161 lever 131 is elevated, which causes the coffee receptacle 33 to be sufficiently raised to permit of drawing the ribbon with the sheet or layer of coffee thereon outwardly and over the pan 31. Such movement is started at position 162 by cam 92 and continues up to position 156 in which the ribbon will have been drawn from beneath the coffee receptacle 33, across the pan 31 and back into the pan, and the lever 87 will have returned to normal position. It will be noted that during this operation all of the other elements are inoperative excepting the coffee receptacle lifting device which maintains the coffee receptacle elevated wherein upon arrival at position 156 the same cycle of operations occur.

Although I have described my device and process as operating intermittently, it is obvious that the coffee may be continuously fed upon the ribbon and the ribbon moved continuously.

My invention is highly meritorious in that a simple and positive device is provided whereby beverages such as coffee and the like may be automatically prepared. By regulating the position of the water valve, any desired strength of coffee may be prepared. The device occupies a minimum amount of space and is adapted to operate continuously without appreciable attention. The ribbon utilized in receiving the layer of coffee may be constructed of inexpensive material so that the same may be discarded after use or the same may be reclaimed, as desired.

Changes in the specific form of my invention, as herein disclosed, may be made within the scope of what is claimed without departing from the spirit of my invention.

Having described my invention, what I claim as new and desire to protect by Letters Patent is:

1. In combination, a pan, a ribbon having a layer of coffee deposited thereon, a clutch adapted to engage said ribbon, means for reciprocating said clutch to cause the same to draw the ribbon across said pan, and means for releasing said clutch to permit of the return movement thereof after the layer of coffee has been brought into proper position above said pan, and means for reengaging said clutch upon its return movement prior to the arrival thereof at its extreme position so as to cause said ribbon to descend to the bottom of said pan.

2. In combination, a pan, a ribbon adapted to be moved across the upper portions of said pan, a swinging arm having a clutch at its free end adapted to move toward and from one end of said pan, said clutch being adapted to engage said ribbon to cause the movement of the same across said pan, means for causing the engagement of said clutch with said ribbon upon its movement from said pan, means for causing the disengagement of said clutch from said ribbon upon its movement toward said pan.

3. In combination, a coffee receptacle having a movable bottom, a member for receiving ground coffee in sheet formation, means for supporting said receptacle with the bottom thereof in spaced relation to said member, the coffee within said receptacle being adapted to rest upon said member when said movable bottom has been withdrawn, said bottom serving to separate the lowermost strata of coffee from the bulk thereof upon inward movement to cause the same to lie in sheet formation upon said member, and means for freeing the ground coffee so formed from said receptacle to permit of the removal of said member from the coffee receptacle.

4. In combination, a receptacle for ground coffee open at the bottom, a slide for opening and closing the bottom of said receptacle, a table, a permeable member movable across said table, means for movably supporting said receptacle with the slide thereof spaced from said permeable member and table, said slide being movable outwardly and inwardly to deposit sheets of coffee upon said permeable member and said receptacle and table being relatively movable toward and from one another to free the coffee deposited upon said permeable member so as to allow the movement of said member from the coffee receptacle.

5. In combination, a permeable member for the reception of a layer of ground coffee, a water conduit superimposing said member, said conduit having a series of perforations adapted to spray water upon the layer of coffee, means for moving said conduit from one end to the other of said layer of coffee, and means for feeding water to said conduit during such movement.

6. In combination, a permeable member for the reception of a layer of ground coffee, a pivoted arm, a water conduit carried by said arm and extending over said member, said conduit having a series of perforations adapted to spray water upon the layer of coffee on said permeable member, means for oscillating said arm to move said conduit over said coffee from one end thereof to the other, and means for feeding water into said conduit during the oscillation of said arm.

7. In combination, a leaching pan, a ribbon having a layer of coffee deposited thereon, means for drawing said ribbon across the upper portion of said leaching pan, and means for causing said ribbon and coffee to descend downwardly upon the bottom of said pan.

8. In combination, a pan, a ribbon having a layer of coffee deposited thereon, a clutch adapted to engage said ribbon, means for reciprocating said clutch to cause the same to draw the ribbon across said pan, and means for releasing said clutch for return movement thereof.

9. In combination, a pan having a ribbon adapted to be moved across the upper portions of said pan, a swinging arm having a clutch at its free end adapted to move toward and from one of the ends of said pan, said clutch being adapted to engage said ribbon to cause the movement of the same across said pan, means for causing the engagement of said clutch with said ribbon upon its movement from said pan, means for causing the disengagement of said clutch from said ribbon upon its movement toward said pan, and means for causing the reengagement of said clutch with said ribbon prior to the arrival of such clutch at its extreme return position so as to cause reverse movement of said ribbon to cause the same to descend to the bottom of said pan.

10. In combination, a pan having a flat bottom, a ribbon movable across the edge of said pan, means for feeding coffee upon said ribbon in sheet-like formation, means for moving the coffee while in sheet-like formation upon the bottom of said pan, and means for applying water to the coffee while disposed upon the bottom of said pan.

11. In combination, a pan having a flat bottom, a ribbon movable across the edge of said pan, means for feeding batches of coffee upon said ribbon in sheet-like formation, said batches being of an area substantially equal to the area of the bottom of the pan, means for moving the coffee from said feeding device to the bottom of the pan, and means for applying water to the coffee while in said pan.

12. In combination, a pan having a flat bottom, a ribbon movable across the edge of said pan, means for feeding coffee upon said ribbon in sheet-like formation upon the bottom of said pan, means for applying water to the coffee while disposed upon the bottom of said pan, and means for arresting the movement of said coffee in said pan during the application of water thereto.

13. In combination, a support, a ribbon movable across said support, a second ribbon positioned above said first ribbon and movable therewith, means for feeding coffee in sheet-like formation between said ribbons, and means for applying water to the coffee while disposed between said ribbons.

14. In combination, a support, a ribbon movable across said support, means superimposing said support for feeding coffee upon said ribbon, a second ribbon, means for laying said second ribbon upon the coffee deposited upon said first ribbon, and means for applying water to the coffee while disposed between said ribbons.

15. In combination, a support, a ribbon movable across said support, a coffee receptacle superimposing said ribbon and support, said receptacle having its lower edge adapted to engage the ribbon, a bottom within said receptacle spaced from said ribbon and movable from said receptacle to deposit a sheet of coffee thereon, and means for raising said receptacle upwardly from said support.

In testimony whereof I have affixed my signature to this specification.

CLARENCE W. CARTER.